United States Patent [19]
Yamamoto

[11] Patent Number: 5,340,994
[45] Date of Patent: Aug. 23, 1994

[54] METHOD FOR INSPECTING THE LENGTH OF A FLEXIBLE THIN OBJECT HAVING BINARIZING AND THINNING STEPS

[75] Inventor: Makoto Yamamoto, Tokyo, Japan
[73] Assignee: Yozan, Inc., Tokyo, Japan
[21] Appl. No.: 980,968
[22] Filed: Nov. 24, 1992
[30] Foreign Application Priority Data
  Nov. 29, 1991 [JP] Japan ................ 3-342456
[51] Int. Cl.$^5$ ............................................. G01N 21/88
[52] U.S. Cl. ................................. 250/572; 250/562; 348/61
[58] Field of Search ................ 250/562, 563, 572; 358/8, 55; 356/394, 379, 392

[56] References Cited
U.S. PATENT DOCUMENTS
4,539,704 9/1985 Pastor ............................ 382/55
4,665,441 5/1987 Sakaue et al. .................. 382/55
5,115,477 5/1992 Groezinger ..................... 382/8

FOREIGN PATENT DOCUMENTS
3101973 5/1988 Japan .
2204881 8/1990 Japan .
3154808 7/1991 Japan .
4003271 1/1992 Japan .

Primary Examiner—David C. Nelms
Assistant Examiner—Que T. Le
Attorney, Agent, or Firm—Cushman, Darby & Cushman

[57] ABSTRACT

A method for automatically inspecting a flexible thin object without having to touch the object. First, a digital image of a flexible thin object is input. Then the image is binarized. The binarized image is then thinned and labeled. The area of the labeled image is then calculated. The flexible thin object is judged to be free of defects when the calculated area is within a predetermined tolerance.

6 Claims, 6 Drawing Sheets

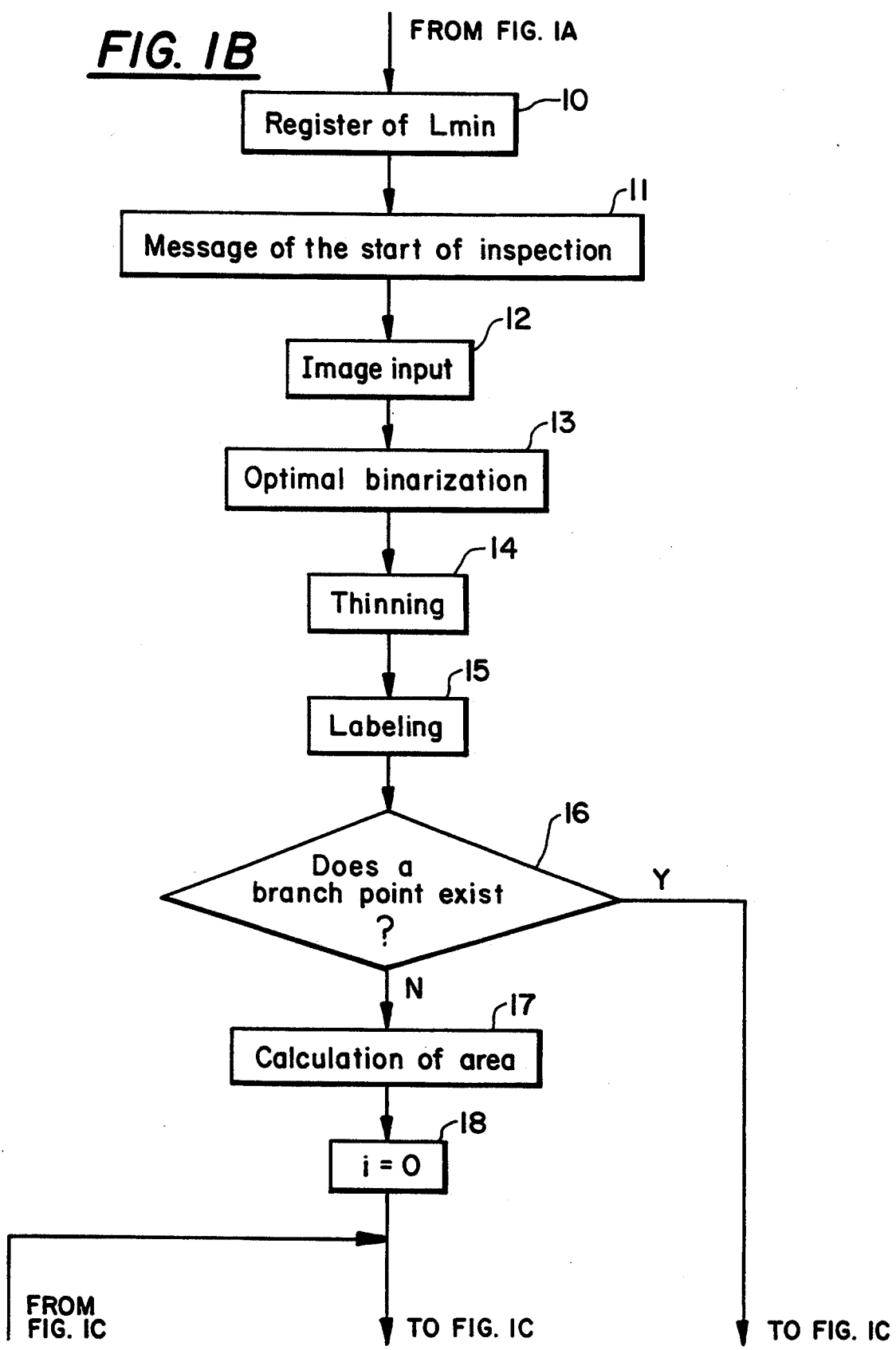

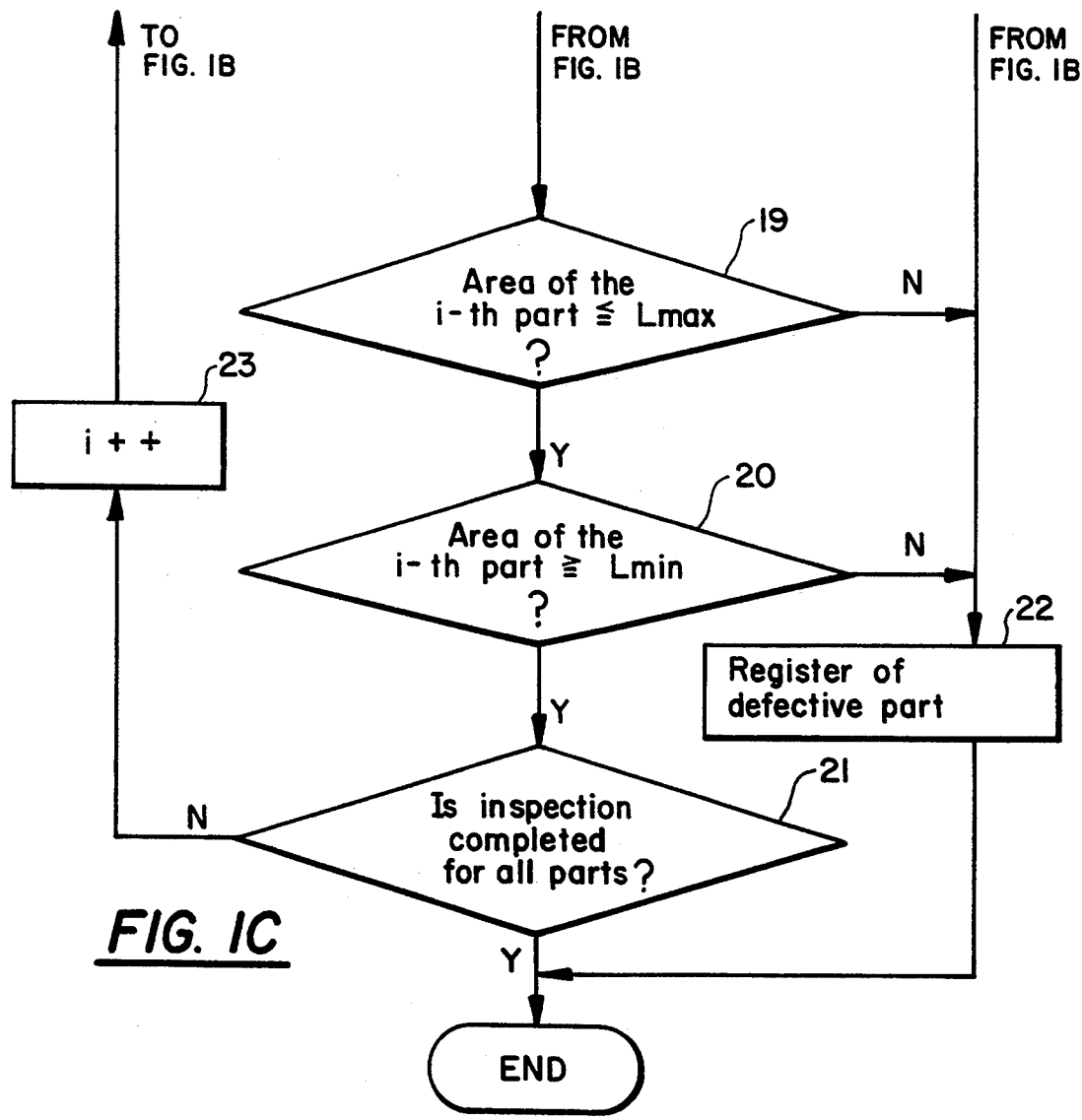
FIG. IC

Configuration Pixel      Background Pixel

*FIG. 6A*
*FIG. 6B*

METHOD FOR INSPECTING THE LENGTH OF A FLEXIBLE THIN OBJECT HAVING BINARIZING AND THINNING STEPS

FIELD OF THE INVENTION

The present invention relates to an inspecting method for flexible thin objects, especially to a method for inspecting the length of an extremely thin electric wire.

BACKGROUND OF THE INVENTION

The small size and high density of today's electrical apparatuses has created a demand for extremely thin electric wires. When wire is cut in a predetermined length for use as a part in an apparatus, automatic inspection of the length is very difficult because the cut wires are thin and irregularly curved. It is not easy to stretch a curved thin object along a scale. Further, it is difficult to stretch a line-type object without adding load and thus distorting the length measurement. Inspection of the length must therefore be performed manually. Unfortunately, the shortage of skilled manual laborers has made it difficult to inspect flexible thin objects such as thin pieces of wire.

SUMMARY OF THE INVENTION

The present invention is designed to solve the problems associated with the inspection of thin objects such as extremely thin wire pieces. An object of the present invention is to provide a method for inspecting the length of a flexible thin object easily and without touching the object.

The inspecting method for flexible thin objects according to the present invention requires: thinning an image of the object, calculating the area of the thinned image, and determining based on the area that was calculated whether the length of the flexible thin object is within tolerance.

When using the present invention, it is not necessary to stretch the flexible thin object; consequently, the length of the object is not distorted. The automatic inspection of the length can therefore be easily accomplished.

BRIEF DESCRIPTION OF THE DRAWINGS

FIGS. 1A, 1B and 1C show a flowchart of an embodiment of the invention.

FIGS. 6A and 6B show the branches of a labeled figure that has a connectedness number equal to 3.

PREFERRED EMBODIMENT OF THE PRESENT INVENTION

Hereinafter an embodiment of the present invention is described with reference to the attached drawings.

Figure 1A:
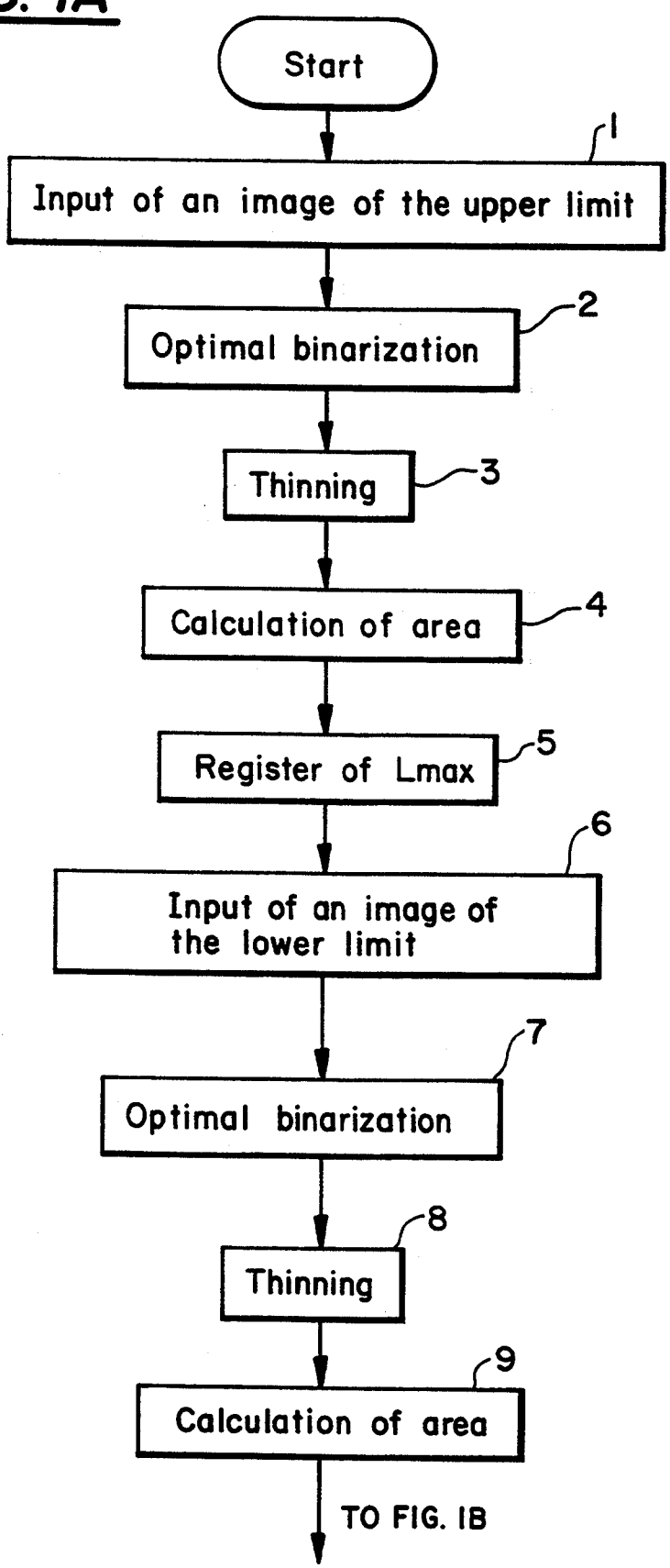

FIG. 1 shows a flowchart for realizing the present invention. Steps 1 to 10 are the inspection presteps. These steps register the upper and lower limits on the area of a defectless object. The upper and lower limits are registered by inputting images of defectless objects with lengths equal to the desired maximum and minimum lengths and by setting the error tolerances based on these images.

An image of a flexible thin object with an area equal to the upper limit area is input in step 1, optimally binarized in step 2, and thinned in step 3. The area of the thinned figure is calculated in step 4 and registered in step 5.

The image of a flexible thin object with an area equal to the lower limit is input in step 6. The image is processed in steps 7-10 in the same fashion as was done for the upper limit. At this point the preprocessing steps of the inspection are completed, and a message that the inspection can be started is indicated on a display as shown in FIG. 1 as step 11.

Figure 2:
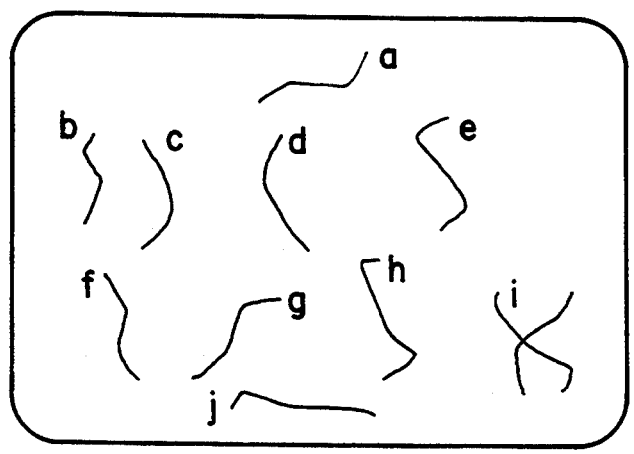
FIG. 2 shows images of thinned figures.
Figure 3:
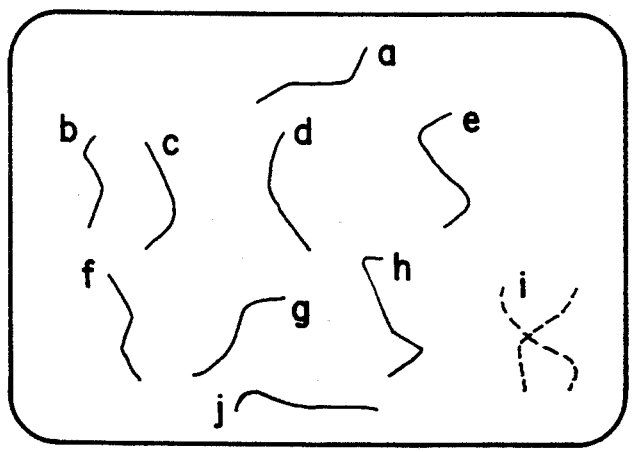
FIG. 3 shows images of thinned figures where the image labeled as "i" corresponds to a defective object.

In step 12, the images of the flexible thin objects being inspected are input. Optimal binarization is performed on these images in step 13, and thinning is performed on them in step 14. "Thinning" means the obtaining of a linear figure with a width of one pixel by reducing pixels from the periphery of the figure being processed without changing the topology of that figure. Thus, a thinned figure remains connected. When two flexible thin objects are overlapped and thinning is performed on their images, an image such as image "i" in FIG. 2 is created. Although thinning may cause the length of the object to become shorter, any error in the length can generally be ignored because the number of thinnings is small for a linear object.

After labeling is performed in step 15, it is determined in step 16 whether or not a branch point exists in the image. Branch points exist when the image being inspected is an image of two overlapping objects; because they are overlapping, these objects should be found to be defective. It is possible to determine the existence of a branch point by examining the number of connectedness (Nc). The formula for it is shown below.

When the number of connectedness is 4, the formula is:

$$N_c^4 = \sum_k (P_k - P_k P_{k+1} P_{k+2})$$

When the number of connectedness is 8, the formula is:

$$N_c^3 = \sum_k (P_k - P_k P_{k+1} P_{k+2})$$

$$(k = 1,3,5,7)$$

Figure 5:
FIG. 5 shows the branches of a labeled figure that has a connectedness number equal to 4.
Figure 5:

FIGS. 5 and 6 show the branches of figures with connectedness 4 and 3 respectively. When a branch is found, the parts corresponding to the figure are registered as defective (step 22). An example of such a defective figure is shown as "i" in FIG. 2.

The area of all the figures not regarded as defective is calculated in step 17. The area can be calculated by the histogram of the image. Counting the number of pixels of a labeled figure is equivalent to calculating the area of the thinned image.

As was stated above, a thinned figure retains the topology of the original image (i.e, it has the same length). Because the width of a thinned figure is by definition equal to one, the area obtained by counting the number of pixels can be regarded as the length of the object being processed.

Figure 4:
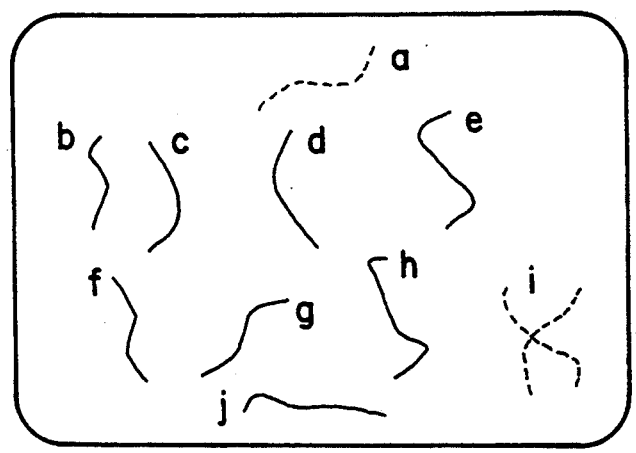
FIG. 4 shows images of thinned figures where the images labeled as "a" and "i" correspond to defective objects.

In steps 19 and 20, the area of the figure is examined to determine whether it is between the upper and lower limits registered earlier in step 5 and 10. If the area of the figure is out of the range, the part being inspected is registered as defective in step 22. An example is shown as "a" in FIG. 4. The processing of steps 12 through 21 is repeated until all the figures have been inspected.

As mentioned above, it is possible to inspect a flexible thin object without touching and stretching the object by using the present invention. Therefore, inspection without distortion is easily possible.

What is claimed is:

1. A method of inspecting the length of a flexible thin object comprising the steps of:
    i) inputting a digital image of the flexible thin object;
    ii) binarizing said image;
    iii) thinning said binarized image;
    iv) labeling said thinned image;
    v) determining the area of the labeled image; and
    vi) judging that the length of said flexible thin object is within tolerance when said calculated area is greater than a lower limit and less than an upper limit.

2. The method of claim 1, wherein the flexible thin object is judged to be defective when the labeled image of said object is found to contain a branch point.

3. The method of claim 1, wherein the area is determined by creating a histogram which tabulates the number of pixels that have been labeled with each the label value.

4. The method of claim 2, wherein the area is determined by creating a histogram which tabulates the number of pixels that have been labeled with each the label value.

5. The method of claim 4, wherein the flexible thin object is judged to be defective when the labeled image of said object is found to contain a branch point.

6. A method of inspecting the length of a flexible thin object comprising the steps of:
    i) inputting a digital image of the flexible thin object;
    ii) binarizing said image;
    iii) thinning said binarized image;
    iv) labeling said thinned image;
    v) counting the number of pixels in the labeled image; and
    vi) judging that the length of said flexible thin object is within tolerance when said number of pixels is greater than a lower limit and less than an upper limit.

* * * * *